United States Patent
Kanai

Patent Number: 6,011,655
Date of Patent: Jan. 4, 2000

[54] EYEPIECE

[75] Inventor: Moriyasu Kanai, Tokyo, Japan

[73] Assignee: Asahi Kogaku Kogyo Kabushiki Kaisha, Tokyo, Japan

[21] Appl. No.: 08/587,748

[22] Filed: Jan. 17, 1996

[30]  Foreign Application Priority Data

Jan. 17, 1995 [JP] Japan .................................. 7-022261

[51] Int. Cl.[7] .................................................. G02B 25/00
[52] U.S. Cl. .................... 359/644; 359/643; 359/673; 359/714; 359/715
[58] Field of Search .................................. 359/643, 644, 359/673, 714, 715, 713, 771, 774

[56]  References Cited

U.S. PATENT DOCUMENTS

| | | | |
|---|---|---|---|
| 4,240,701 | 12/1980 | Lytle ........................................ | 359/715 |
| 5,151,823 | 9/1992 | Chen ........................................ | 359/774 |
| 5,162,945 | 11/1992 | Matsuo et al. ........................... | 359/646 |
| 5,300,977 | 4/1994 | Lewis et al. ............................. | 359/644 |
| 5,305,147 | 4/1994 | Hasegawa et al. ...................... | 359/715 |

FOREIGN PATENT DOCUMENTS

| | | | |
|---|---|---|---|
| 60-57315 | 4/1985 | Japan . | |
| 1-90409 | 4/1989 | Japan ...................................... | 359/774 |
| 387709 | 4/1991 | Japan . | |
| 387710 | 4/1991 | Japan . | |

*Primary Examiner*—Georgia Y. Epps
*Assistant Examiner*—Jordan M. Schwartz
*Attorney, Agent, or Firm*—Greenblum & Bernstein, P.L.C.

[57]  ABSTRACT

An eyepiece including a positive first lens element, a negative second lens element, a positive third lens element and a positive fourth lens element is provided. The first, second, third, and fourth lens elements are spaced from one another and arranged in this order from an object side. At least one of the four lens elements is a plastic lens with at least one aspherical surface satisfying the relationships defined by;

$$d^2x/dh^2 \leq \{c/(1-0.5c^2h^2)^{3/2}\}: \text{ when } c > 0; \text{ and}$$

$$d^2x/dh^2 \geq \{(c/1-0.5c^2h^2)^{3/2}\}): \text{ when } c < 0;$$

wherein
"c" represents paraxial curvature;
"x" represents sag amount; and,
"h" represents a height from an optical axis.

34 Claims, 6 Drawing Sheets

EYEPIECE

BACKGROUND OF THE INVENTION

1. Field of the Invention

The present invention relates to an eyepiece which is used, for example, in binoculars or in a microscope, and more specifically relates to an ocular lens including four lens elements.

2. Description of Related Art

An eyepiece for a microscope comprised of four lens elements is disclosed, for example, in Japanese Unexamined Patent Publication No. 60-57315. The eyepiece disclosed in JPP '315 is made of a glass having a high refractive index.

An eyepiece for binoculars, made of a plastic material less expensive than glass, is also disclosed, for example, in Japanese Unexamined Patent Publication No. 3-87710 or No. 3-87709. The eyepiece in these publications is comprised of two positive and one negative lens elements, and two positive and two negative lens elements, respectively.

In order to provide a plastic lens with a necessary power, it is necessary to reduce the radius of curvature thereof. Since the selection of a refractive index for a plastic lens is restricted in comparison with a glass lens, if the radius of curvature of a lens surface is small, light (peripheral light) passing though the peripheral portion of the lens has a large comatic aberration, or a total reflection of the peripheral light at the lens surface occurs. To prevent this, in the publications mentioned above, the plastic eyepiece is comprised of positive and negative lens elements which are cemented to each other. The surfaces, of these lens elements, having the smallest radius of curvature are cemented.

SUMMARY OF THE INVENTION

The primary object of the present invention is to provide an inexpensive eyepiece, for which no cementing operation is necessary, which can reduce not only the assembling cost but also the material cost, and in which less comatic aberration or no total reflection of the peripheral light occurs.

To achieve the object mentioned above, according to an aspect of the present invention, there is provided an eyepiece including a positive first lens element, a negative second lens element, a positive third lens element and a positive fourth lens element. The first to fourth lens elements being spaced from one another and arranged in this order from an object side, wherein at least one of the lens elements is a plastic lens element provided with at least one aspherical surface and satisfies the following relationships (1):

$$d^2x/dh^2 \leq \{c/(1-0.5c^2h^2)^{3/2}\}: \text{ when } c > 0; \quad (1)$$
$$d^2x/dh^2 \geq \{c/(1-0.5c^2h^2)^{3/2}\}: \text{ when } c < 0;$$

wherein
"c" designates paraxial curvature;
"x" designates sag amount; and,
"h" designates height from an optical axis.

According to another aspect of the present invention, there is provided an eyepiece including a negative auxiliary lens group, a field stop, a positive first lens element, a negative second lens element, a positive third lens element and a positive fourth lens element. These lens elements being spaced from one another and arranged in this order from the object side, wherein at least one of the first to fourth lens elements is a plastic lens provided with at least one aspherical surface and satisfies the following relationships (1):

$$d^2x/dh^2 \leq \{c/(1-0.5c^2h^2)^{3/2}\}: \text{ when } c > 0; \quad (1)$$
$$d^2x/dh^2 \geq \{c/(1-0.5c^2h^2)^{3/2}\}: \text{ when } c < 0;$$

wherein
"c" designates paraxial curvature;
"x" designates sag amount; and
"h" designates height from an optical axis.

BRIEF DESCRIPTION OF THE DRAWINGS

The invention will be described below in detail with reference to the accompanying drawings, in which.

DESCRIPTION OF THE PREFERRED EMBODIMENT

Figure 1:
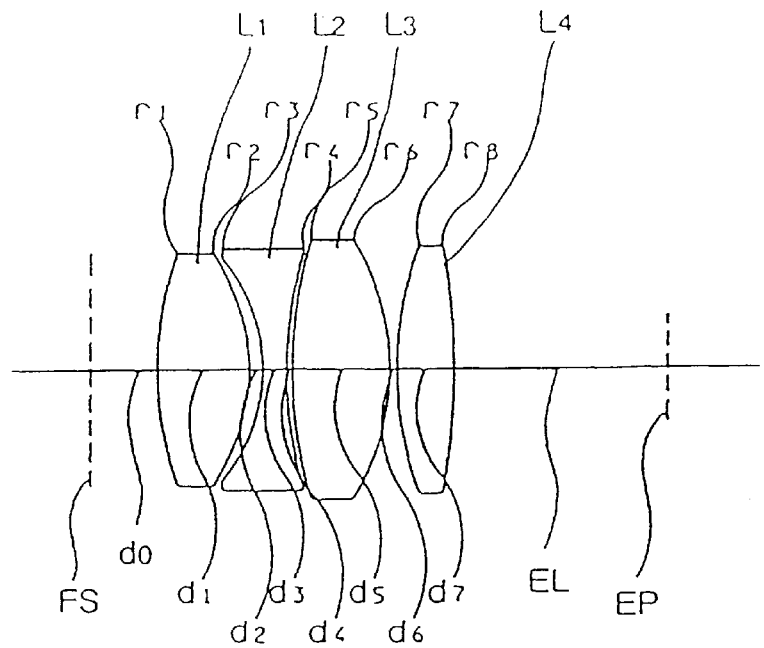
FIG. 1 is a schematic view showing a lens arrangement of an eyepiece, according to a first embodiment of the present invention.

In accordance with one feature of the present invention, an eyepiece is comprised of a positive first lens element L1, a negative second lens element L2, a positive third lens element L3 and a positive fourth lens element L4, arranged between a field stop FS and an eye point EP, in this order from the object side. These lens elements L1 through L4 are separate and spaced from one another. Owing to the independence of the lens elements, no cementing operation is necessary, thus resulting in a reduction in the assembling or manufacturing cost thereof. Moreover, positive power is distributed in the eyepiece by the three positive lens elements, and hence, the radius of curvature of the positive lens elements can be made large enough to reduce comatic aberration and the occurrence of total reflection.

Furthermore, at least one of the four lens elements L1 to L4 is a plastic lens element. In the embodiments, three lens elements, i.e., the first, second and third lens elements L1, L2 and L3 are plastic lens elements, and only the fourth lens element L4 is a glass lens element. The use of the plastic lens element(s) makes it possible to reduce material cost, in comparison with an optical arrangement in which all the lens elements are glass lens elements. If it is desired that material cost should be minimized, it is preferable that all the lens elements are made of plastic. Nevertheless, in the embodiments, the fourth lens element is a glass lens. The reason for this is because if the fourth lens element is made of plastic, the outwardly exposed surface thereof on the eye point side could be easily damaged or scratched. To prevent this, the fourth lens element is made of glass which is more durable.

One or two of the lens surfaces including the surface r2 of the positive first lens element L1 on the eye point side, the surface r3 of the negative second lens element L2 on the object side, the surface r4 of the negative second lens element L2 on the eye point side and the surface r5 of the positive third lens element L3 on the object side, is or are an aspherical surface or aspherical surfaces which satisfies or satisfy the relationships defined by the following formula (1):

$$d^2x/dh^2 \leq \{c/(1-0.5c^2h^2)^{3/2}\}; \text{ when } c > 0; \quad (1)$$
$$d^2x/dh^2 \geq \{c/(1-0.5c^2h^2)^{3/2}\}; \text{ when } c < 0;$$

wherein
"c" designates paraxial curvature;
"x" designates sag amount; and,
"h" designates height from an optical axis.

The formula (1) specifies the requirement to restrict the refracting power of the lens at the peripheral portion thereof so as not to be too large. On a spherical surface, the value of $d^2x/dh^2$ suddenly changes as the height h from the optical axis approaches $|r_n|$, so that comatic aberration, astigmatism, and distortion become large. Consequently, if an aspherical surface of which no sudden change in the value of $d^2x/dh^2$ occurs is used, the comatic aberration, astigmatism, and the distortion can be effectively corrected. Moreover, a chromatic aberration which would be excessively corrected (over-correction) in the absence of an aspherical surface can be appropriately corrected.

Figure 11:
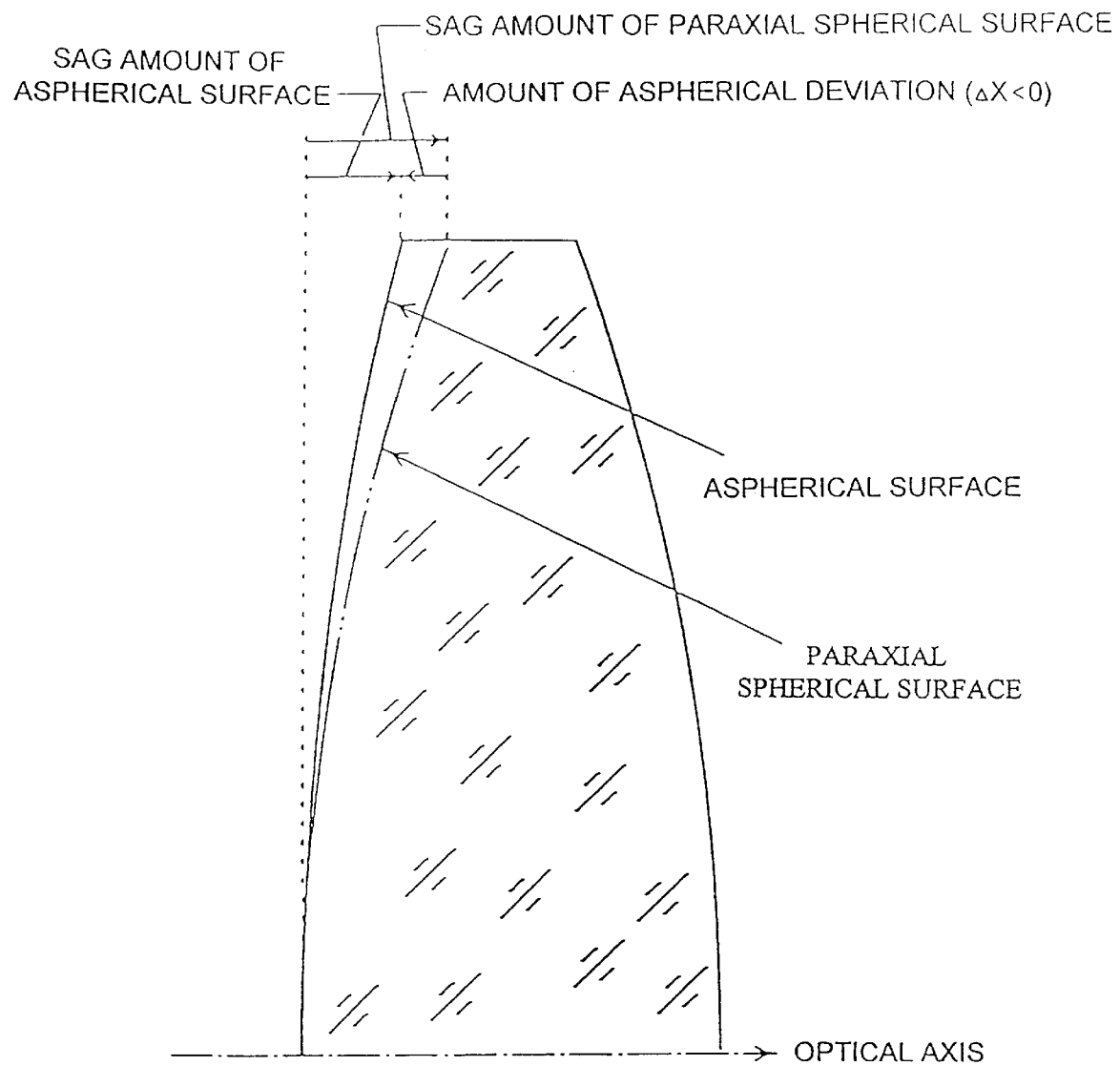
FIG. 11 is an enlarged explanatory view of an aspheric lens to explain the amount of aspheric deviation and sag amount.

The radius of curvature $r_{nh}$ of the n-th surface in the meridional direction at the height h from the optical axis, and $d^2x$ and $dh^2$ can be obtained by the following calculations (formulae 9 and 8, respectively). The aspherical surface is represented by the following formula (6), wherein the distance (amount of sag) of the coordinates on the aspherical surface at the height h from the optical axis, from a tangential plane to the apex of the aspherical surface is "x"; the curvature (1/r) of the apex of the aspherical surface is "c", the constant of the cone is "K", and the 2i-th order aspheric coefficient is "$A_{2i}$", respectively. FIG. 11 shows the relationship between paraxial spherical surface, aspherical surface, the amount of aspheric deviation and the sag amounts of the paraxial spherical surface and aspherical surface.

$$x=(ch^2/[1+\{1-(K+1)c^2h^2\}^{1/2}])+\Sigma A_2 h^{2i} (i=2) \quad (6)$$

The linear differential and the secondary differential of the equation (6) are represented by the formulae (7) and (8) below. The radius of curvature $r_{nh}$ in the meridional direction can be then obtained by the formula (9) below.

$$dx/dh=[ch/\{(1-(K+1)c^2h^2\}^{1/2}]+\Sigma 2iA_2 h^{2i-1} (i=2) \quad (7)$$
$$d^2x/dh^2=[c/\{1-(K+1)c^2h^2\}^{3/2}]+\Sigma 2i(2i-1)A_2 h^{2i-2} (i=2) \quad (8)$$
$$r_{nh}=[1+(dx/dh)^2]^{3/2}/(d^2x/dh^2) \quad (9)$$

The eyepiece of the embodiments of the present invention satisfies the relationships defined by the following formulae (2), (3) and (4), wherein "fn" represents the focal length, "υn" represents the Abbe number of the n-th lens, "Pn" represents the reciprocal of the product "fnυn" of the focal length and the Abbe number (i.e., 1/fnυn), and "rn" represents the paraxial radius of curvature of the n-th surface defined from the object side (n=1, 2, 3 and 4):

$$0.4 < f1/f3 < 1.2 \quad (2)$$
$$0.8 < |P2/(P1+P3+P4)| < 1.2 \quad (3)$$
$$0.7 < r3/r2 < 1.25 \quad (4)$$

The formula (2) is related to the power distribution of the first and the third lens elements. If the ratio of f1/f3 satisfies formula (2), the comatic aberration and the distortion can be appropriately corrected. If the value of the ratio is below the lower limit of formula (2), the power of the first lens element is too strong, and if the value of the ratio is above the upper limit, the power of the third lens element is too strong. If the power of the first or the third lens elements is too strong, the radius of curvature of the lens surface of that lens element is small, and consequently, comatic aberration or distortion tend to be produced.

The formula (3) specifies the requirement to compensate for transverse chromatic aberration by the positive lens elements and the negative lens element. If the value of the ratio is below the lower limit of formula (3), the power of the negative lens element is too weak in comparison with the positive lens elements, or the dispersion of the negative lens element is small relative to the positive lens elements, and hence, the chromatic aberration cannot be effectively compensated. Conversely, if the ratio is above the upper limit in formula (3), the power or dispersion of the negative lens element is too large, thus resulting in an over-correction for chromatic aberration.

In general, when a plastic lens element whose refractive index is low is used, it is necessary to increase the radius of curvature thereof in order to obtain a sufficient power. It is possible to increase the radius of curvature of the eyepiece lens according to the present invention in comparison with a conventional plastic eyepiece, however the radius of curvature remains smaller than that of the glass eyepiece.

The formula (4) specifies the requirement to balance the relatively small radii of curvature of the surfaces of the second and third lens elements and compensate the aberrations caused by the surfaces of the lens elements by shortening the distance between the surfaces of the second and third lens elements. If the ratio is below the lower limit of formula (4), the radius of curvature of the surface of the third lens element is too small, and if the ratio is above the upper limit, the radius of curvature of the surface of the second lens element is too small. In either case, the aberrations caused by one of the surfaces of the lens elements cannot be compensated by the other surface of the lens element, so comatic aberration, astigmatism or distortion remains.

Moreover, the eyepiece according to the embodiments of the present invention is designed such that the radius of curvature "r4h" of the surface of the second lens element on the eye point side at the height h from the optical axis in the meridional direction satisfies the formula (5) below:

$$1.1f < |r4h| < 5.0f \quad (5)$$

wherein h=0.333f when the resultant focal length of the first to fourth lens elements is represented by "f".

The formula (5) specifies the requirement to minimize the aberrations which are caused when the first, second and third lens elements, whose powers tend to become strong, are relatively deviated. Namely, formula (5) specifies the requirement to reduce sensitivity to the deviation (amount of decentration) of the lens elements.

If the value of the ratio in formula (5) is above the upper limit, the power of the surface of the fourth lens element is weak, so that the power of the surface of the third lens element should be increased accordingly. Consequently, sensitivity to decentration between the first and second lens elements becomes high. Conversely, if the ratio is smaller than the lower limit, the power of the surface of the fourth lens element is strong, so that sensitivity to decentration between the second and third lens elements becomes high. If the conditions defined by formula (5) are satisfied, enhanced aberrations for the whole lens system, caused by the decentration between the first lens element and the second lens element and between the third lens element and the second lens element, can be well balanced.

Five embodiments of the present invention will be described. In the tables shown below "f" designates the focal length, "B" the half angle of view, "d0" the distance between the field stop and the surface on the object side of of the first lens element L1, "EL" the eye relief, "r" the radius of curvature, "d" the lens thickness or the distance between the lens elements on the optical axis, "n" the refractive index of the d-line (588 nm), and "υ" the Abbe number of the d-line, respectively.

Figure 2:
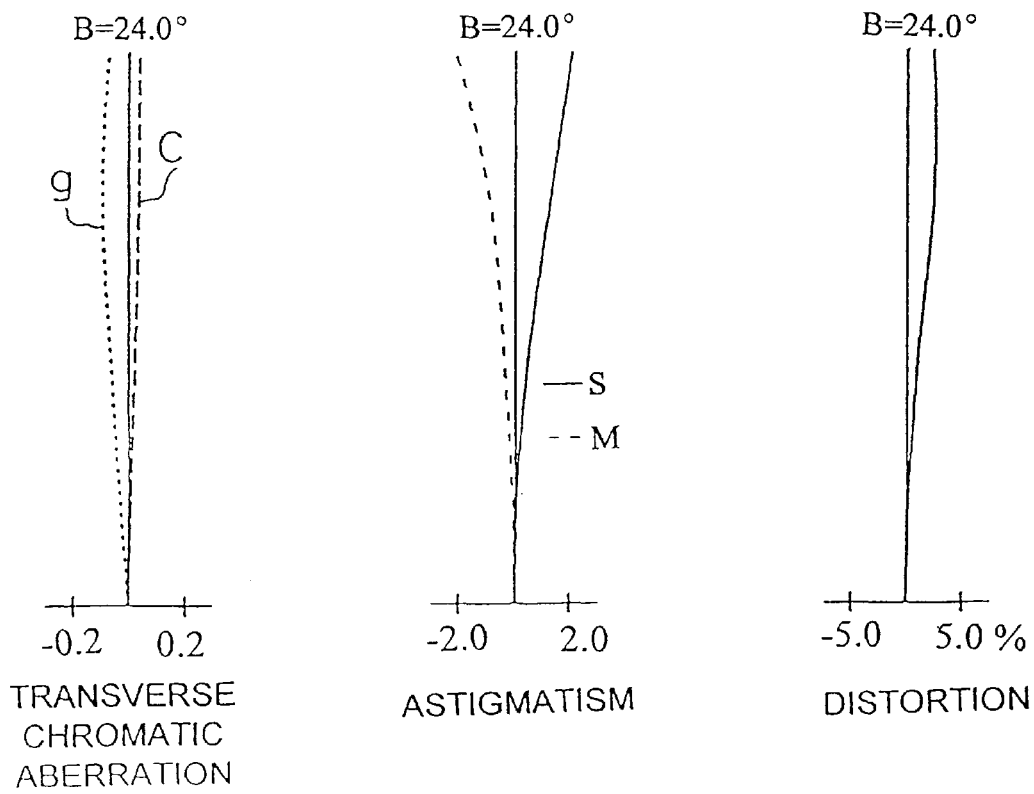
FIG. 2 shows diagrams of aberrations of the lens system shown in FIG. 1.

1st Embodiment:

The lens arrangement of an eyepiece system according to a first embodiment of the present invention is shown in FIG. 1. Numerical data of the first embodiment is shown in Table 1 below. FIG. 2 shows transverse chromatic aberrations represented by the g-line (436 nm) and the C-line (656 nm), astigmatism (S: sagittal rays, and M: meridional rays), and distortion in the first embodiment, respectively.

In the first embodiment, the surface on the eye point side of the first lens element L1 (second surface) is an aspherical surface. The radius of curvature of the aspherical surface in Table 1 is that at the apex of the aspherical surface. The constant of the cone and the aspherical surface coefficient are also shown in Table 1. Aspherical surface coefficients higher than 5-th order aspherical surface coefficients are all zero and accordingly are not shown in the table.

The shape of the aspherical surface can be generally expressed as follows:

$$X = CY^2 / \{1 + [1-(1+K)C^2Y^2]^{1/2}\} + A_4Y^4 + A_6Y^6 + A_8Y^8 + A_{10}Y^{10} + \ldots$$

wherein, Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents an eighth-order aspherical factor, $A_{10}$ represents a tenth-order aspherical factor.

TABLE 1 f = 15.06
B = 24.0°
d0 = 4.28
EL = 13.0

| Surface No. | r | d | n | υ |
|---|---|---|---|---|
| 1 | 21.250 | 5.92 | 1.49175 | 57.4 |

TABLE 1-continued f = 15.06
B = 24.0°
d0 = 4.28
EL = 13.0

| Surface No. | r | d | n | υ |
|---|---|---|---|---|
| 2* | −11.117 | 0.91 | — | — |
| 3 | −10.503 | 1.50 | 1.58547 | 29.9 |
| 4 | 26.766 | 0.40 | — | — |
| 5 | 29.109 | 6.10 | 1.49176 | 57.4 |
| 6 | −15.250 | 0.50 | — | — |
| 7 | 22.838 | 3.50 | 1.60311 | 60.7 |
| 8 | −43.779 | — | — | — |

Figure 3:
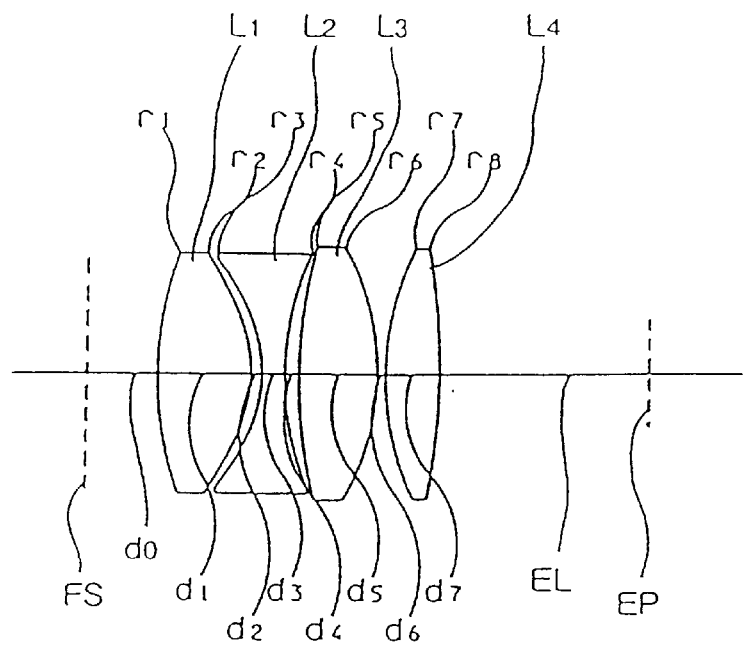
FIG. 3 is a schematic view showing a lens arrangement of an eyepiece, according to a second embodiment of the present invention.
Figure 4:
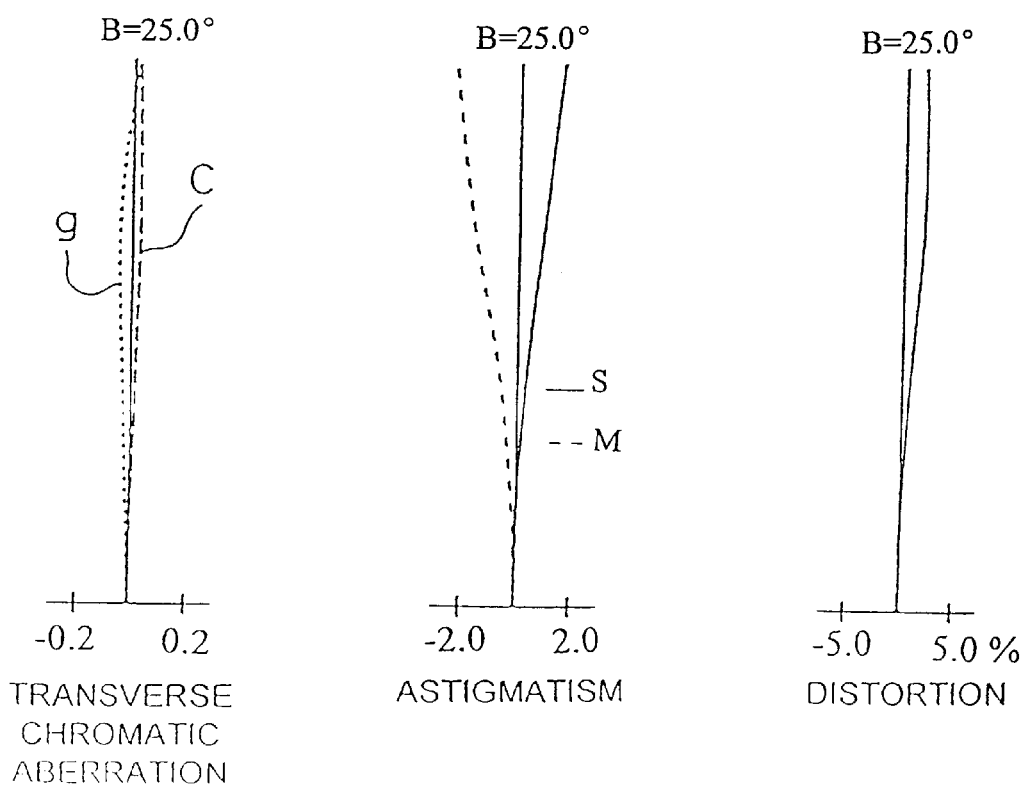
FIG. 4 shows diagrams of aberrations of the lens system shown in FIG. 3.

*denotes aspherical surface.
aspherical data:
Second surface: K = 0.10000 × 10, A4 = 0.26581 × 10$^{-4}$ 2nd Embodiment:

The lens arrangement of an eyepiece system according to a second embodiment of the present invention is shown in FIG. 3, and the aberrations of the optical system shown in FIG. 3 are shown in FIG. 4. Numerical data of the second embodiment is shown in Table 2 below. In the second embodiment, the surface on the eye point side of the first lens element L1 (second surface) and the surface on the object side of the second lens element L2 (third surface) are aspherical surfaces.

TABLE 2 f = 15.06
B = 25.0°
d0 = 4.29
EL = 13.0

| Surface No. | r | d | n | υ |
|---|---|---|---|---|
| 1 | 21.516 | 6.08 | 1.49176 | 57.4 |
| 2* | −8.630 | 0.66 | — | — |
| 3* | −8.783 | 1.50 | 1.58547 | 29.9 |
| 4 | 18.461 | 0.89 | — | — |
| 5 | 31.915 | 4.90 | 1.49176 | 57.4 |
| 6 | −16.316 | 0.50 | — | — |
| 7 | 17.648 | 3.50 | 1.60311 | 60.7 |
| 8 | −45.312 | — | — | — |

Figure 5:
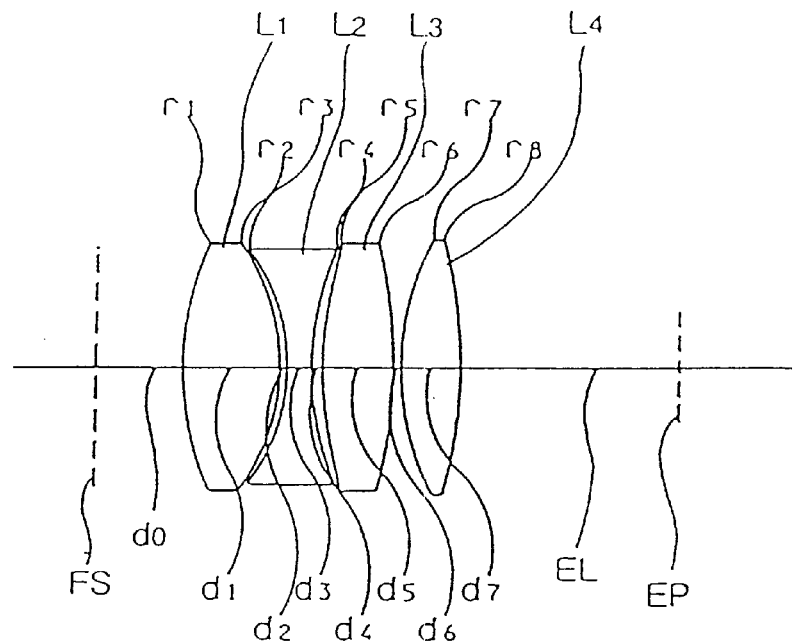
FIG. 5 is a schematic view showing a lens arrangement of an eyepiece, according to a third embodiment of the present invention.
Figure 6:
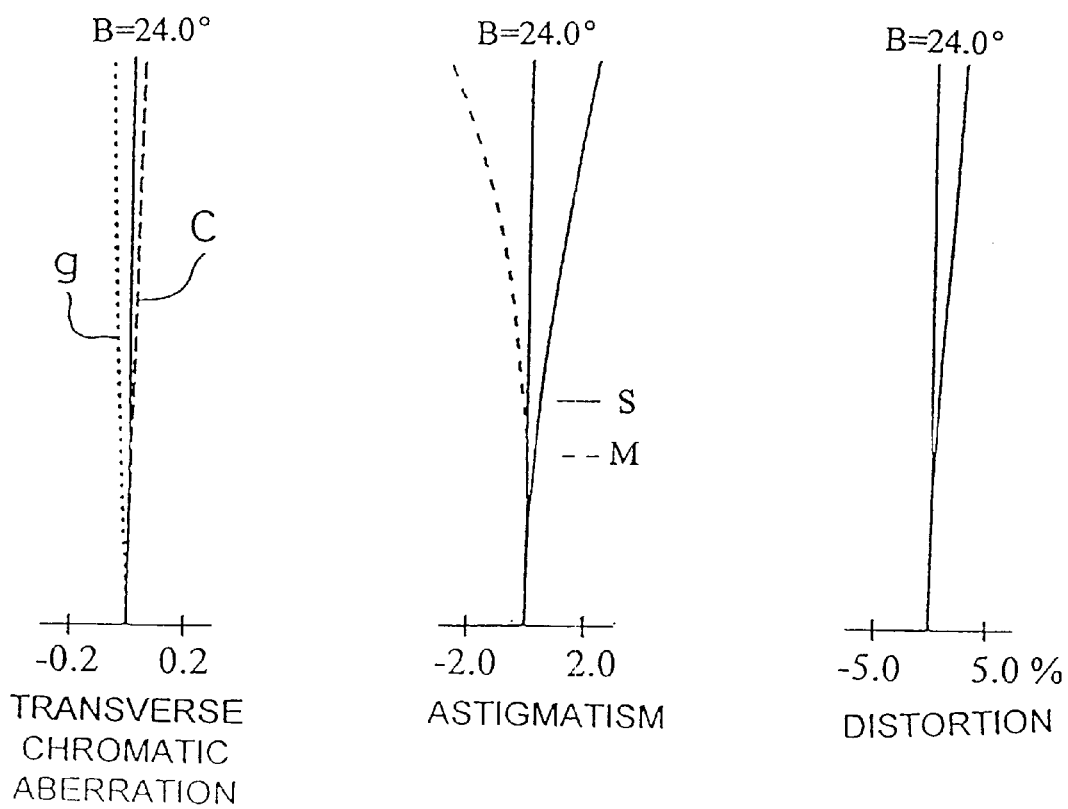
FIG. 6 shows diagrams of aberrations of the lens system shown in FIG. 5.

*denotes aspherical surface.
aspherical data:
Second surface: K = −0.10000 × 10, A4 = 0.14421 × 10$^{-3}$
Third surface: K = −0.10000 × 10, A4 = 0.40620 × 10$^{-4}$ 3rd Embodiment:

The lens arrangement of an eyepiece system according to a third embodiment of the present invention is shown in FIG. 5, and the aberrations of the optical system shown in FIG. 5 are shown in FIG. 6. Numerical data of the third embodiment is shown in Table 3 below. In the third embodiment, the surface on the object side of the third lens element L3 (fifth surface) is an aspherical surface.

TABLE 3 f = 15.07
B = 24.0°
d0 = 5.49
EL = 13.0

| Surface No. | r | d | n | υ |
|---|---|---|---|---|
| 1 | 18.196 | 5.95 | 1.49176 | 57.4 |
| 2 | −13.039 | 0.50 | — | — |
| 3 | −11.986 | 1.50 | 1.58547 | 29.9 |

TABLE 3-continued f = 15.07
B = 24.0°
d0 = 5.49
EL = 13.0

| Surface No. | r | d | n | ν |
|---|---|---|---|---|
| 4 | 17.999 | 0.71 | — | — |
| 5* | 19.672 | 4.20 | 1.49176 | 57.4 |
| 6 | −32.038 | 0.50 | — | — |
| 7 | 17.240 | 3.50 | 1.60311 | 60.7 |
| 8 | −30.990 | — | — | — |

Figure 7:
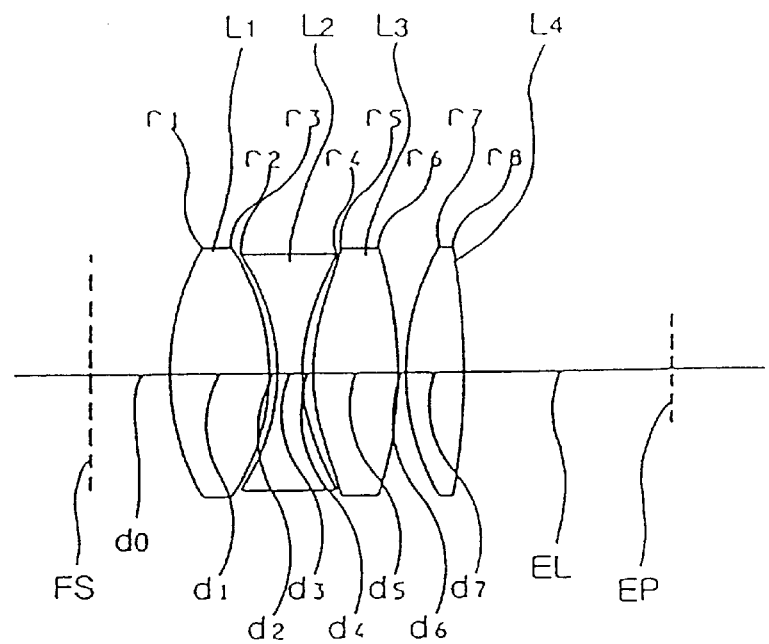
FIG. 7 is a schematic view showing a lens arrangement of an eyepiece, according to a fourth embodiment of the present invention.
Figure 8:
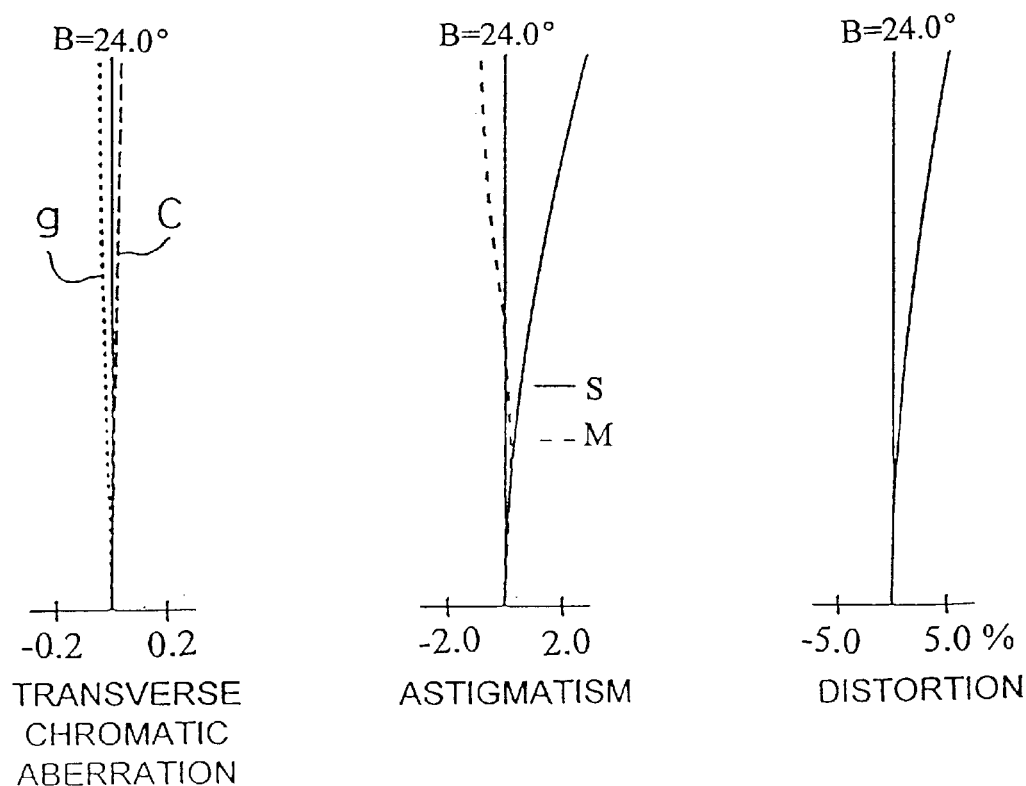
FIG. 8 shows diagrams of aberrations of the lens system shown in FIG. 7.

*denotes aspherical surface.
aspherical data:
Fifth surface: K = −0.10000 × 10, A4 = −0.20255 × 10$^{-3}$ 4th Embodiment:

The lens arrangement of an eyepiece system according to a fourth embodiment of the present invention is shown in FIG. 7, and the aberrations of the optical system shown in FIG. 7 are shown in FIG. 8. Numerical data of the fourth embodiment is shown in Table 4 below. In the fourth embodiment, the surface on the eye point side of the second lens element L2 (fourth surface) and the surface on the object side of the third lens element L3 (fifth surface) are aspherical surfaces. In this embodiment, since the fourth surface is aspherical, the value of "r4h" is obtained by the aspherical coefficients.

TABLE 4 f = 15.07
B = 24.0°
d0 = 4.79
EL = 13.0

| Surface No. | r | d | n | ν |
|---|---|---|---|---|
| 1 | 15.757 | 6.21 | 1.49176 | 57.4 |
| 2 | −13.975 | 0.55 | — | — |
| 3 | −12.871 | 1.50 | 1.58547 | 29.9 |
| 4* | 11.487 | 0.69 | — | — |
| 5* | 12.360 | 5.21 | 1.49176 | 57.4 |
| 6 | −25.800 | 0.50 | — | — |
| 7 | 16.248 | 3.50 | 1.60311 | 60.7 |
| 8 | −45.778 | — | — | — |

Figure 9:
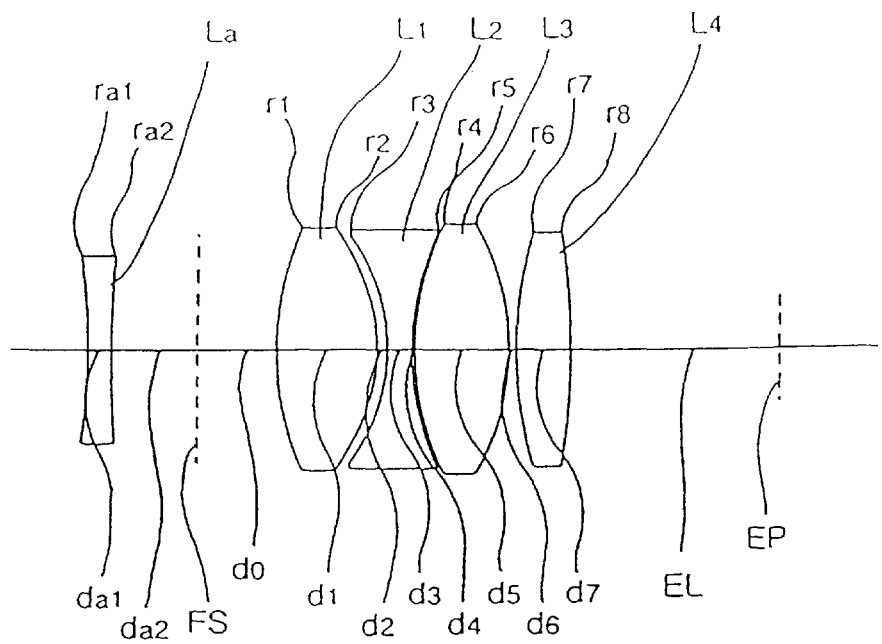
FIG. 9 is a schematic view showing a lens arrangement of an eyepiece, according to a fifth embodiment of the present invention.

*denotes aspherical surface.
aspherical data:
Fourth surface: K = −0.10000 × 10, A4 = −0.83728 × 10$^{-4}$
Fifth surface: K = −0.10000 × 10, A4 = −0.18534 × 10$^{-3}$ 5th Embodiment:

The lens arrangement of an eyepiece system according to a fifth embodiment of the present invention is shown in FIG. 9. In the fifth embodiment, a negative auxiliary lens group La is provided closer to an object than the field stop FS which is located on the object side of the first lens element L1. The entrance pupil of the eyepiece is shifted toward the eye point by the negative auxiliary lens group La, so that the eye relief EL can be increased. Moreover, the Petzval sum can be reduced to be approximately zero by the negative auxiliary lens group La. Thus, in the fifth embodiment, the curvature of field can be more effectively compensated than in the previous four embodiments.

In the fifth embodiment, the auxiliary lens group La is made of a single biconcave (double-concave) lens; the first to third lens elements L1 to L3 and the auxiliary lens group La are made of plastic and the fourth lens element L4 is made of glass.

Figure 10:
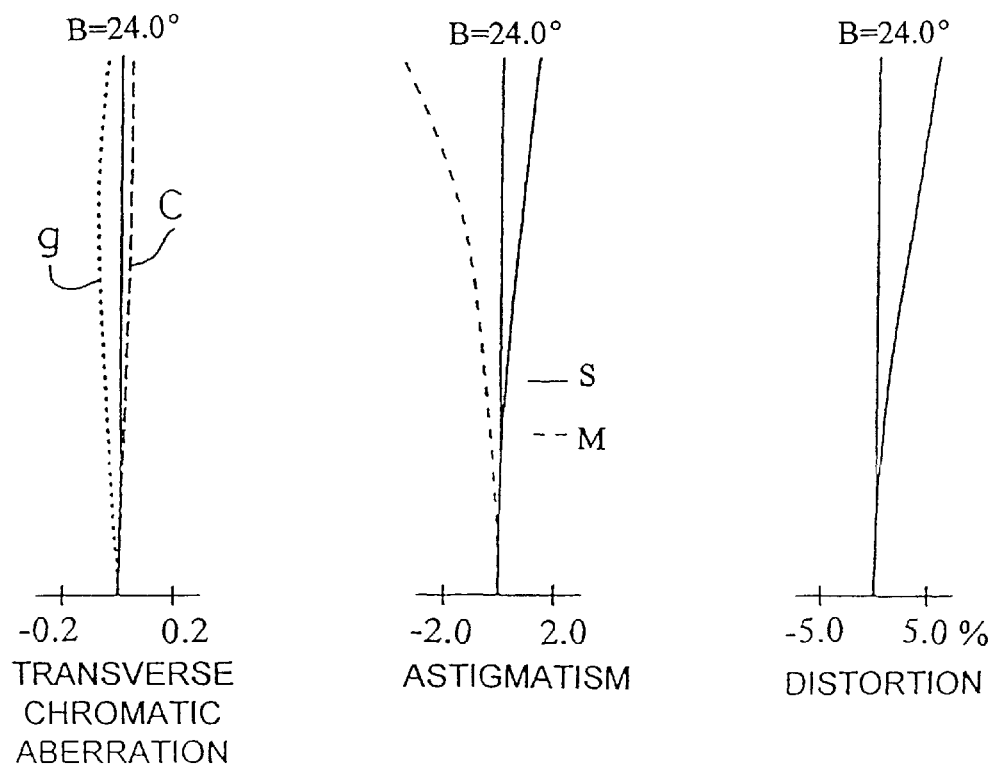
FIG. 10 shows diagrams of aberrations of the lens system shown in FIG. 9.

In the fifth embodiment, the surface on the eye point side of the first lens element L1 (second surface) is an aspherical surface. The aberrations of the optical system shown in FIG. 9 are shown in FIG. 10. Numerical data and aspherical surface coefficient of the fifth embodiment are shown in Table 5 below. Furthermore, the resultant focal length of this embodiment can be obtained by calculations using the values r, d and n and equals 15.069.

TABLE 5 f = 13.52
B = 24.0°
d0 = 5.00
EL = 13.5

| Surface No. | r | d | n | ν |
|---|---|---|---|---|
| a1 | −39.900 | 1.50 | 1.49176 | 57.4 |
| a2 | 75.438 | 5.64 | — | — |
| FS | ∞ | 5.00 | — | — |
| | first ~ fourth lens elements | | | |
| 1 | 18.980 | 6.60 | 1.49176 | 57.4 |
| 2* | −10.663 | 0.70 | — | — |
| 3 | −11.891 | 1.50 | 1.58547 | 29.9 |
| 4 | 17.660 | 0.26 | — | — |
| 5 | 17.929 | 6.00 | 1.49176 | 57.4 |
| 6 | −16.256 | 0.50 | — | — |
| 7 | 26.360 | 3.50 | 1.60311 | 60.7 |
| 8 | −48.651 | — | — | — |

*denotes aspherical surface.
aspherical data:
Second surface: K = −0.10000 × 10, A4 = 0.2300 × 10$^{-4}$ With respect to the aspherical surfaces in the first, second and fifth embodiments, formula (1) can be replaced with the following formula (10), since the curvature "c" is smaller than zero (c<0):

$$c+12A_4h^2 \geq \{c/(1-0.5c^2h^2)^{3/2}\} \quad (10)$$

The left term in formula (10) is an increasing monotonic function since A4>0, and the right term is a decreasing monotonic function within 0≦h≦hmax (the values of "hmax" are shown in Table 6 below). When h=0, since the left term in formula (10) is equal to the right term, it is apparent that the first, second and fifth embodiments satisfy formula (10) and accordingly the formula (1) within the range of 0≦h≦hmax.

Similarly, with respect to the aspherical surfaces in the third and fourth embodiments, formula (1) can be replaced with the following formula (11), since the curvature "c" is larger than zero (c>0):

$$c+12A_4h^2 \leq \{c/(1-0.5c^2h^2)^{3/2}\} \quad (11)$$

The left term in formula (11) is a decreasing monotonic function since A4<0, and the right term is an increasing monotonic function within 0≦h≦hmax (the values of "hmax" are shown in Table 6). When h=0, since the left term in the formula (11) is equal to the right term, it is apparent that the third and fourth embodiments satisfy formula (11) and accordingly formula (1) within the range of 0 h≦hmax.

TABLE 6

| | Surface | |
|---|---|---|
| Embodiment 1 | r2 | 7.10 |
| Embodiment 2 | r2 | 7.54 |
| | r3 | 7.19 |
| Embodiment 3 | r5 | 6.87 |
| Embodiment 4 | r4 | 7.25 |
| | r5 | 7.34 |

TABLE 6-continued

| | Surface | |
|---|---|---|
| Embodiment 5 | r2 | 7.71 |

Table 7 below shows numerical values of the formulae (2) through (5) corresponding to the five embodiments. It can be seen from Table 7 that in any of the embodiments the eyepiece satisfies all the requirements. The aberrations are effectively compensated and sensitivity to deviation or decentration is kept low.

TABLE 7

| | Embodiment 1 | Embodiment 2 | Embodiment 3 |
|---|---|---|---|
| formula (2) | 0.741 | 0.591 | 0.647 |
| formula (3) | 1.025 | 1.186 | 1.061 |
| formula (4) | 0.945 | 1.018 | 0.912 |
| formula (5) | 1.78f | 1.23f | 1.67f |

| | Embodiment 4 | Embodiment 5 |
|---|---|---|
| formula (2) | 0.909 | 0.814 |
| formula (3) | 1.151 | 1.047 |
| formula (4) | 0.921 | 1.115 |
| formula (5) | 3.01f | 1.17f |

As may be understood from the above discussion, according to the present invention, since all the lenses; are separate from each other, no cementing operation is; necessary, thus resulting in a reduced assembling cost. Moreover, since there are three positive lens elements to distribute the positive power, the radius of curvature of the positive lens elements can be made relatively large, and hence, less comatic aberration or less total reflection occurs.

Furthermore, since at least one of the first through fourth lens elements is made of a plastic lens, the material cost can be reduced in comparison with an eyepiece in which all the lens elements are made of glass.

In addition, since the aspherical surface is used, the comatic aberration and the distortion can be effectively compensated. Moreover, an over-correction of the chromatic aberration, which occurs at the peripheral portion of the lens in an eyepiece employing no aspherical surface, does not take place. Namely, the chromatic aberration can be appropriately compensated.

In the case that the negative lens group is provided on the object side of the first lens element, since the entrance pupil of the eyepiece is shifted toward the eye point, not only can eye relief be increased but also the Petzval sum can be reduced to be approximately zero. Thus, the curvature of field can be more appropriately compensated than an eyepiece having no negative lens group.

What is claimed is:

1. An eyepiece comprising:
    a positive first lens element;
    a negative second lens element;
    a positive third lens element; and,
    a positive fourth lens element,
    said first, second, third and fourth lens elements being spaced from one another and arranged in this order from an object side;
    said eyepiece defining an angle of view equal to or greater than 48°;
    at least one of said first, second, third and fourth lens elements comprising a plastic lens element, at least one of said at least one plastic lens element including at least one aspherical surface satisfying the following relationships:

$d^2x/dh^2 \leq \{c/(1-0.5c^2h^2)^{3/2}\}$: when $c>0$; and $d^2x/dh^2 \geq \{c/(1-0.5c^2h^2)^{3/2}\}$: when $c<0$, wherein
    "c" represents a paraxial curvature;
    "x" represents a sag amount; and
    "h" represents a height from an optical axis.

2. The eyepiece according to claim 1, said eyepiece satisfying the relationship:

$0.4 < f1/f3 < 1.2$ wherein
    "f1" represents a focal length of said first lens element; and,
    "f3" represents a focal length of said third lens element.

3. The eyepiece according to claim 1, said eyepiece satisfying the following relationship:

$0.8 < |P2/(P1+P3+P4)| < 1.2$ wherein
    "Pn" represents a reciprocal of the product "fnυn", where "n" designates one of said first, second, third, and fourth lens elements;
    "fn" represents a focal length of an n-th lens element; and
    "υn" represents an Abbe number of the n-th lens element.

4. The eyepiece according to claim 1, said eyepiece satisfying the relationship:

$0.7 < r3/r2 < 1.25$ wherein
    "r2" represents a paraxial radius of curvature of a surface of the first lens element located on an eye point side; and,
    "r3" represents a paraxial radius of curvature of a surface of the second lens element located on the object side.

5. The eyepiece according to claim 1, said first lens element comprising a plastic lens including an eye point side surface comprising an aspherical surface.

6. The eyepiece according to claim 1, said second lens element comprising a plastic lens including an object side surface comprising said aspherical surface.

7. The eyepiece according to claim 1, said third lens element comprising a plastic lens including an object side surface comprising said aspherical surface.

8. The eyepiece according to claim 1, said second lens element comprising a plastic lens including an eye point side surface comprising said aspherical surface.

9. The eyepiece according to claim 1, wherein a radius of curvature in the meridional direction of an eye point side surface of said second lens element at a height from the optical axis satisfies the relationship:

$1.1f < |r4h| < 5.0f$ wherein "r4h" represents the paraxial radius of curvature, in the meridional direction, of said eye point side surface of said second lens element at a height h from the optical axis, "h" represents the height from the optical axis and is equal to 0.0333f, and "f" represents a resultant focal length of the first to fourth lens elements.

10. The eyepiece according to claim 1, an average of the index of refraction of each of said positive first lens element, negative second lens element, positive third lens element, and positive fourth lens element being less than 1.6.

11. The eyepiece according to claim 1, at least one of said positive first lens element, negative second lens element, positive third lens element and positive fourth lens element being located between a field stop and an eye point side of said eyepiece.

12. The eyepiece according to claim 1, said positive fourth lens element comprising a glass lens.

13. The eyepiece according to claim 12, further comprising a field stop located on the object side of said first lens element, and a negative auxiliary lens group positioned closer to the object side than said field stop.

14. An eyepiece comprising:

a negative auxiliary lens group;

a field stop;

a positive first lens element;

a negative second lens element;

a positive third lens element; and, a positive fourth lens element, said negative auxiliary lens group, said field stop, said positive first lens element, said negative second lens element, said positive third lens element and said positive fourth lens element being spaced from one another and arranged in this order from an object side;

at least one of said first, second, third, and fourth lens elements comprising a plastic lens, at least one of said at least one plastic lens element including at least one aspherical surface which satisfies the relationships:

$d^2x/dh^2 \leq \{c/(1-0.5c^2h^2)^{3/2}\}$: when c>0; and $d^2x/dh^2 \geq \{c/(1-0.5c^2h^2)^{3/2}\}$: when c<0, wherein "c" represents paraxial curvature;

"x" represents sag amount; and,

"h" represents a height from an optical axis.

15. The eyepiece according to claim 14, said eyepiece satisfying the relationship:

$0.4 < f1/f3 < 1.2$ wherein

"f1" represents a focal length of said first lens element; and,

"f3" represents a focal length of said third lens element.

16. The eyepiece according to claim 14, said eyepiece satisfying the relationship:

$0.8 < |P2/(P1+P3+P4)| < 1.2$ wherein

"Pn" represents a reciprocal of the product "fnυn", where "n" designates one of said first, second, third, and fourth lens elements;

"fn" designates the focal length of an n-th lens element;

"υn" designates an Abbe number of the n-th lens element.

17. The eyepiece according to claim 14, said eyepiece satisfying the relationship:

$0.7 < r3/r2 < 1.25$ wherein

"r2" represents a paraxial radius of curvature of a surface of said first lens element located on an eye point side; and, "r3" represents a paraxial radius of curvature of the surface of said second lens element located on said object side.

18. The eyepiece according to claim 14, said first lens element comprising a plastic lens including an eye point side surface comprising said aspherical surface.

19. The eyepiece according to claim 14, said second lens element comprising a plastic lens including an object side surface comprising said aspherical surface.

20. The eyepiece according to claim 14, said third lens element comprising a plastic lens including an object side surface comprising said aspherical surface.

21. The eyepiece according to claim 14, said second lens element comprising a plastic lens including an eye point side surface comprising said aspherical surface.

22. The eyepiece according to claim 14, said first, second, and third lens elements and said auxiliary lens group each comprising plastic lenses.

23. The eyepiece according to claim 14, wherein said eyepiece defines an angle of view equal to or greater than 48°.

24. The eyepiece according to claim 14, an average of the index of refraction of each of said positive first lens element, negative second lens element, positive third lens element, and positive fourth lens element being less than 1.6.

25. An eyepiece comprising:

a positive first lens element;

a negative second lens element;

a positive third lens element; and, a positive fourth lens element, said first, second, third and fourth lens elements being spaced from one another and arranged in this order from an object side, at least one of said positive first lens element, negative second lens element, positive third lens element and positive fourth lens element being located between a field stop and an eye point of said eyepiece;

at least one of said first, second, third and fourth lens elements comprising a plastic lens element, at least one of said at least one plastic lens element including at least one aspherical surface satisfying the following relationships:

$d^2x/dh^2 \leq \{c/(1-0.5c^2h^2)^{3/2}\}$: when c>0; and $d^2x/dh^2 \geq \{c/(1-0.5c^2h^2)^{3/2}\}$: when c<0, wherein "c" represents a paraxial curvature;

"x" represents sag amount; and

"h" represents a height from an optical axis.

26. The eyepiece according to claim 25, said eyepiece satisfying the relationship:

$0.4 < f1/f3 < 1.2$ wherein

"f1" represents a focal length of said first lens element; and,

"f3" represents a focal length of said third lens element.

27. The eyepiece according to claim 25, said eyepiece satisfying the relationship:

$$0.8 < |P2/(P1+P3+P4)| < 1.2$$

wherein

"Pn" represents a reciprocal of the product "fnυn", where "n" designates one of said first, second, third, and fourth lens elements;

"fn" represents a focal length of an n-th lens element; and

"υn" represents an Abbe number of the n-th lens element.

28. The eyepiece according to claim 25, said eyepiece satisfying the relationship:

$$0.7 < r3/r2 < 1.25$$

wherein

"r2" represents a paraxial radius of curvature of a surface of the first lens element located on an eye point side; and, "r3" represents a paraxial radius of curvature of a surface of the second lens element located on the object side.

29. The eyepiece according to claim 25, said first lens element comprising a plastic lens including an eye point side surface comprising an aspherical surface.

30. The eyepiece according to claim 25, said second lens element comprising a plastic lens including an object side surface comprising said aspherical surface.

31. The eyepiece according to claim 25, said third lens element comprising a plastic lens including an object side surface comprising said aspherical surface.

32. The eyepiece according to claim 25, said second lens element comprising a plastic lens including an eye point side surface comprising said aspherical surface.

33. The eyepiece according to claim 25, wherein a radius of curvature in the meridional direction of an eye point side surface of said second lens element at a height from the optical axis satisfies the relationship:

$$1.1f < |r4h| < 5.0f$$

wherein "r4h" represents the paraxial radius of curvature, in the meridional direction, of said eye point side surface of said second lens element at a height h from the optical axis, "h" represents the height from the optical axis and is equal to 0.0333f, and "f" represents a resultant focal length of the first to fourth lens elements.

34. The eyepiece according to claim 25, an average of the index of refraction of each of said positive first lens element, negative second lens element, positive third lens element, and positive fourth lens element being less than 1.6.

* * * * *